Patented May 23, 1944

2,349,518

UNITED STATES PATENT OFFICE 2,349,518

PURIFICATION OF PHTHALIC ANHYDRIDE

Frank Porter, Syracuse, N. Y., assignor to The Solvay Process Company, New York, N. Y., a corporation of New York No Drawing. Application January 18, 1941, Serial No. 375,020

8 Claims. (Cl. 260—342.5)

This invention relates to a method of purifying phthalic anhydride, particularly a crude or a partially purified phthalic anhydride which has been produced by the catalytic oxidation of napthalene or other organic substance in the vapor phase.

In the production of phthalic anhydride by subjecting napthalene in the vapor phase to partial or selective oxidation by means of air or other oxygen-containing gas in the presence of a suitable catalyzer at an appropriate temperature, it is well known that the phthalic anhydride produced is usually contaminated with various impurities. The bulk of these impurities can usually be removed by distillation or by holding the crude phthalic anhydride at or near the boiling point for some time, followed by distillation.

However, it has been found that after this procedure there still remains a small proportion of impurities which impart an undesirable color and odor to the product.

The present process provides a simple and efficient means of removing these colored and odorous impurities so that a good grade of phthalic anhydride can be economically produced from a crude product containing impurities difficult to remove by fractionation. Solid oxidizing agents and other oxidizing agents such as vanadium pentoxide and oleum, have the disadvantage of leaving solid or semi-solid undesirable residues or being difficult to remove from the phthalic anhydride.

In accordance with the present invention, it has been found that impurities, particularly those remaining after a preliminary distillation, may be removed from phtalic anhydride by treatment of the molten anhydride with nitric acid.

By use of the applicant's process, substantially pure, colorless and odorless phthalic anhydride is produced. The use of nitric acid has an advantage over the use of other oxidizing agents mentioned above in that it is readily separated from phthalic anhydride by distillation and leaves relatively little residue. What residue is left is liquid and can be readily handled.

The nitric acid treatment is carried out by bubbling nitric acid vapor through molten phthalic anhydride, preferably with mechanical agitation. The nitric acid is preferably diluted with steam to a concentration of from 20% to 60% by weight of nitric acid. In place of steam, air, carbon dioxide, or nitrogen may be used as a diluent, but steam is preferred because water and nitric acid may be easily mixed in the desired proportions and the mixture continuously and completely vaporized to give constant proportions of steam and nitric acid vapor. Although the treatment is ordinarily carried out under substantially atmospheric pressure, it may also be carried out under greater than atmospheric pressure so as to retain a greater amount of $HNO_3$ in the liquid phase.

The preferred procedure for carrying out the present invention is to first remove the bulk of the impurities by preliminary distillation of the crude phthalic anhydride. If this step is omitted a considerably larger amount of nitric acid is required for purifying a given quantity of phthalic anhydride. The distilled phthalic anhydride is maintained in a liquid state at between 200° and 285° C., and nitric acid in aqueous solution is injected below the surface of the liquid where it at once vaporizes due to the high temperature of the liquid. The resulting mixture of steam and nitric acid vapor bubbles through the liquid which is preferably mechanically agitated in order to insure good contact between the reagent and the phthalic anhydride.

As mentioned above, it has been found that aqueous nitric acid in concentrations of from 20% to 60% by weight give the best results in the present process. When diluents other than steam are used, about the same molar proportions of nitric acid to diluent as are used with steam are usually suitable.

It has also been found that higher concentrations of nitric acid give best results at lower temperatures. Thus, for example, using 60% aqueous nitric acid the optimum temperature of operation is about 240° C., whereas using 20% aqueous nitric acid the optimum temperature of operation is about 260° C. The water vapor and uncondensable gases which are produced in the present process are cooled to about 135° C. in order to condense most of the phthalic anhydride that is carried off by these gases. The gases are then scrubbed with water to recover any remaining phthalic anhydride.

After the nitric acid treatment the phthalic anhydride is fractionally distilled. Impurities are found in the forerunnings and in the still residue, the middle cut of phthalic anhydride, i. e., about 90% of the distillate, being a desirable product with very little color or odor.

The ratio of nitric acid to phthalic anhydride and the concentration of nitric acid may be varied within wide limits, depending upon the degree of purity desired, the efficiency of the mechanical agitation used and the temperature of treatment. The preferred ratios of nitric acid ($HNO_3$) to phthalic anhydride are those within the range 0.005 to 0.015 (by weight). The preferred concentrations of nitric acid in the aqueous solution used are from 20% to 60% by weight.

The following examples, in which the parts are by weight, serve to illustrate the present process:

*Example 1.*—2000 parts of intermediate product, having a dark color (above 500 Platinum-Cobalt (Hazen) Color Standard) and a pungent disagreeable odor, made by a preliminary distillation of crude phthalic anhydride from the vapor phase oxidation of naphthalene, are maintained at 260° C. For three hours it is treated with 45% nitric acid (balance water) which is vaporized by introducing it continuously below the surface of the liquid phthalic anhydride. 20 parts of $HNO_3$ are introduced in this manner. During the treatment the liquid is agitated with a mechanical stirrer. The complete treatment requires three hours. The final distillation of this treated product gives 10% forerunnings with a color of 50 Platinum-Colbalt (Hazen) Color Standard, and a main phthalic anhydride fraction having a color of 25° on the Platinum-Cobalt (Hazen) Color Standard Scale and with a barely detectable odor. About 1.5% of the product remains as a liquid still residue which contains 1% of combined nitrogen. The forerunnings, consisting mainly of phthalic anhydride, are set aside to be reprocessed.

*Example 2.*—About 20,000 parts of intermediate product similar to that in Example 1 are treated at 260° C. by introducing 20% nitric acid (balance water) below the surface of the liquid. The treatment is continued for about eleven hours during which about 200 parts of $HNO_3$ are introduced. During the treatment the liquid is agitated with a mechanical stirrer, the $HNO_3$ being introduced near the stirrer so as to facilitate distribution in the phthalic anhydride. On subsequent distillation the main phthalic anhydride fratcion as well as the individual samples taken during the distillation of the main fraction has a color in the range 20 to 30 on the Platinum-Cobalt (Hazen) Color Standard Scale and an agreeable odor.

The end point of the treatment is ordinarily determined by distilling samples taken from time to time until a distilled sample gives the desired color properties of phthalic anhydride.

The Platinum-Cobalt (Hazen) Color Standard Scale herein referred to is the one described at page 71 of "Physical and Chemical Examination of Paints, Varnishes, Lacquers and Colors" by Henry A. Gardner, 1939 ed., published by Institute of Paint and Varnish Research, Washington, D. C.

The exact nature of the impurities removed by the nitric acid treatment is not known, but they are believed to be mainly naphthoquinone with some unidentified odorous impurities which are not sulfur compounds (the impurities found in some anhydrides). The applicant has discovered that these impurities are more easily oxidized than the phthalic anhydride itself, and in addition some of these impurities unite with nitric acid to form nitro compounds which are sufficiently different in boiling point from phthalic anhydride to make it possible to separate them from the phthalic anhydride by distillation. Although applicant does not limit his invention to any particular mechanism, it seems probable that the nitric acid in the present process acts both as an oxidizing and a nitrating agent.

I claim:

1. In a process of purifying phthalic anhydride obtained by the vapor phase oxidation of organic substances and containing impurities which are not sulfur compounds, the step which comprises introducing an aqueous solution of nitric acid into the said phthalic anhydride in molten state so as to vaporize the nitric acid and contacting thus formed vapors of nitric acid with the molten phthalic anhydride until substantial amounts of said impurities are converted into reaction products separable from the phthalic anhydride by distillation.

2. The process of prifying phthalic anhydride obtained by the vapor phase oxidation of organic substances which comprises distilling the said phthalic anhydride and condensing a distillate of partially purified phthalic anhydride, introducing nitric acid vapor into a molten body of the partially purified phthalic anhydride, contacting said vapor of nitric acid with the molten phthalic anhydride until substantial amounts of impurities other than sulfur compounds contained therein are converted into reaction products separable from the phthalic anhydride by distillation and distilling the so-treated phthalic anhydride.

3. The process of purifying phthalic anhydride obtained by the vapor phase oxidation of organic substances, which comprises distilling the said phthalic anhydride and condensing a distillate of partially purified phthalic anhydride, introducing an aqueous solution of nitric acid containing from 20% to 60% by weight of nitric acid into a molten body of the partially purified phthalic anhydride so as to vaporize the nitric acid, contacting thus formed vapors of nitric acid with the molten phthalic anhydride until substantial amounts of impurities therein other than sulfur compounds are converted into reaction products separable from the phthalic anhydride by distillation, and distilling the so-treated phthalic anhydride.

4. The process of purifying phthalic anhydride obtained by the vapor phase oxidation of organic substances, which comprises distilling the said phthalic anhydride and condensing a distillate of partially purified phthalic anhydride, introducing an aqueous solution of nitric acid containing from 20% to 60% by weight of nitric acid into a mechanically agitated molten body of the partially purified phthalic anhydride so as to vaporize the nitric acid, contacting thus formed vapors of nitric acid with the molten phthalic anhydride until substantial amounts of impurities therein other than sulfur compounds are converted into reaction products separable from the phthalic anhydride by distillation, and distilling the so-treated phthalic anhydride.

5. The process of purifying phthalic anhydride obtained by the vapor phase oxidation of naphthalene, which comprises distilling the said phthalic anhydride to separate therefrom a partially purified phthalic anhydride distillate fraction, introducing aqueous 20% to 60% $HNO_3$ into a molten body of the partially purified distillate fraction in proportions between 0.5 and 1.5 uparts of $HNO_3$ per 100 parts of distillate so as to vaporize the nitric acid and contact the partially purified phthalic anhydride with the thus formed vapors of nitric acid to convert impurities other than sulfur compounds therein into reaction products separable from the phthalic anhydride by distillation, and distilling the so-treated phthalic anhydride.

6. The process of purifying phthalic anhydride obtained by the vapor phase oxidation of naphthalene, which comprises distilling the said phthalic anhydride to separate therefrom a partially purified phthalic anhydride distillate fraction, introducing aqueous 20% to 60% $HNO_3$ into a molten body of the partially purified distillate fraction maintained at a temperature between 200° C. and the boiling temperature of the anhydride in proportions between 0.5 and 1.5 parts of $HNO_3$ per 100 parts of distillate so as to vaporize the nitric acid and contact the partially purified phthalic anhydride with the thus formed vapors of nitric acid to convert impurities other than su'fur compounds therein into reaction products separable from the phthalic anhydride by distillation, and distilling the so-treated phthalic anhydride.

7. The process of purifying phthalic anhydride obtained by vapor phase oxidation, which comprises distilling the said phthalic anhydride and condensing a distillate of partially purified phthalic anhydride, introducing an aqueous solution of nitric acid containing from 20% to 60% by weight of nitric acid into a mechanically agitated, molten body of the partially purified phthalic anhydride at from 200° C. to 285° C. so as to vaporize the nitric acid, contacting thus formed vapors of nitric acid with the molten phthalic anhydride until substantial amounts of impurities therein other than sulfur compounds are converted into reaction products separable from the phthalic anhydride by distillation, and distilling the so-treated phthalic anhydride.

8. The process of purifying phthalic anhydride obtained by the vapor phase oxidation of naphthalene, which comprises distilling the said phthalic anhydride and condensing a distillate of partially purified phthalic anhydride, introducing an aqueous solution of nitric acid containing from 20% to 60% by weight of nitric acid into a mechanically agitated, molten body of the partially purified phthalic anhydride at from 200° C. to 285° C. so as to vaporize the nitric acid, contacting thus formed vapors of nitric acid with the molten phthalic anhydride until substantial amounts of impurities therein other than sulfur compounds are converted into reaction products separable from the phthalic anhydride by distillation, distilling the so-treated phthalic anhydride, and recovering the middle fraction of pure phthalic anhydride.

FRANK PORTER.